United States Patent
Chang

(10) Patent No.: US 10,053,616 B2
(45) Date of Patent: Aug. 21, 2018

(54) ENCAPSULATED NANOCOMPOSITIONS FOR INCREASING HYDROCARBON RECOVERY

(71) Applicant: Saudi Arabian Oil Company, Dhahran (SA)

(72) Inventor: Yun Chang, Dhahran (SA)

(73) Assignee: SAUDI ARABIAN OIL COMPANY (SA)

( * ) Notice: Subject to any disclaimer, the term of this patent is extended or adjusted under 35 U.S.C. 154(b) by 38 days.

(21) Appl. No.: 15/093,923

(22) Filed: Apr. 8, 2016

(65) Prior Publication Data

US 2016/0298022 A1   Oct. 13, 2016

Related U.S. Application Data

(60) Provisional application No. 62/145,219, filed on Apr. 9, 2015.

(51) Int. Cl.
| | | |
|---|---|---|
| *E21B 43/267* | (2006.01) | |
| *C09K 8/584* | (2006.01) | |
| *C09K 8/594* | (2006.01) | |
| *E21B 43/16* | (2006.01) | |
| *B01J 13/08* | (2006.01) | |
| *B01J 13/14* | (2006.01) | |
| *B01J 13/16* | (2006.01) | |

(52) U.S. Cl.
CPC .......... *C09K 8/584* (2013.01); *B01J 13/08* (2013.01); *B01J 13/14* (2013.01); *B01J 13/16* (2013.01); *C09K 8/594* (2013.01); *E21B 43/16* (2013.01); *E21B 43/267* (2013.01); *C09K 2208/10* (2013.01)

(58) Field of Classification Search
CPC .... C09K 8/584; C09K 8/594; C09K 2208/10; B01J 13/08; B01J 13/14; E21B 43/16; E21B 43/267
USPC ..................................................... 166/305.1
See application file for complete search history.

(56) References Cited

U.S. PATENT DOCUMENTS

| | | |
|---|---|---|
| 3,335,794 A | 8/1967 | Bond |
| 3,508,612 A | 4/1970 | Reisberg et al. |
| 4,207,946 A * | 6/1980 | Haltmar .................. C09K 8/882 166/270.1 |
| 4,353,806 A | 10/1982 | Canter et al. |
| 4,426,303 A | 1/1984 | Nuckels |
| 5,069,936 A | 12/1991 | Yen |
| 5,373,901 A | 12/1994 | Norman |
| 5,591,700 A | 1/1997 | Harris et al. |
| 6,225,262 B1 | 5/2001 | Irwin |
| 6,302,209 B1 * | 10/2001 | Thompson, Sr. ... B01F 17/0028 166/305.1 |
| 8,403,044 B2 | 3/2013 | Hutchison |
| 8,512,862 B2 | 8/2013 | Berkland |
| 8,513,168 B2 | 8/2013 | Barnes |
| 8,524,803 B2 | 9/2013 | Miyabayashi |
| 8,664,166 B2 | 3/2014 | Raney |
| 8,759,261 B2 | 6/2014 | Barnes |
| 8,889,600 B2 | 11/2014 | Hutchison |
| 8,940,668 B2 | 1/2015 | Barnes |
| 9,102,862 B2 | 8/2015 | Raney |
| 2004/0014607 A1 | 1/2004 | Sinclair et al. |
| 2005/0167104 A1 | 8/2005 | Roddy |
| 2008/0202744 A1 * | 8/2008 | Crews .................... C09K 8/602 166/246 |
| 2009/0192053 A1 | 7/2009 | Crews et al. |
| 2009/0281003 A1 | 11/2009 | Shahin et al. |
| 2009/0301731 A1 * | 12/2009 | McDaniel ............... C09K 8/68 166/372 |
| 2010/0267594 A1 | 10/2010 | Rana |
| 2011/0214862 A1 | 9/2011 | Horton |

(Continued)

FOREIGN PATENT DOCUMENTS

| | | |
|---|---|---|
| CN | 101167706 A | 4/2008 |
| WO | WO0134939 A1 | 5/2001 |

(Continued)

OTHER PUBLICATIONS

Machine Translation of CN101167706 Published Apr. 30, 2008; 11 Pages.
Waters, G. A., and D. D. DeLeon. "Encapsulated breakers in the Red Fork formation of the Anadarko basin: a case history." SPE Production Operations Symposium. Society of Petroleum Engineers, 1993. 567-573.
Ahuja et al., "Optimal path selection for minimizing the differential delay in Ethernet-over-SONET", Computer Networks, 2006, pp. 2349-2363, vol. 50, No. 13, Elsevier.

(Continued)

*Primary Examiner* — Silvana C Runyan
(74) *Attorney, Agent, or Firm* — Bracewell LLP; Constance Gall Rhebergen

(57) ABSTRACT

A method for increasing production in a liquid hydrocarbon reservoir formation comprising the steps of introducing a nanoencapsulated composition solution capable of reducing the surface tension of a liquid hydrocarbon fraction, where the nanoencapsulated composition solution comprises a nanocapsule and a carrier fluid, such that the nanocapsule is dispersed in the carrier fluid; allowing the nanoencapsulated composition solution to interact with the liquid hydrocarbon fraction such that the surface tension of the liquid hydrocarbon fraction is reduced such that at least a portion of the liquid hydrocarbon fraction is capable of being displaced; introducing a water fraction into the wellbore under conditions such that at least a portion of the liquid hydrocarbon fraction is displaced from the liquid hydrocarbon reservoir formation; and recovering the at least a portion of the liquid hydrocarbon fraction and at least a portion of the nanoencapsulated composition solution using the wellbore.

18 Claims, 1 Drawing Sheet

(56) References Cited

U.S. PATENT DOCUMENTS

| | | |
|---|---|---|
| 2012/0160487 A1 | 6/2012 | Barnes |
| 2013/0023450 A1 | 1/2013 | Kanj et al. |
| 2013/0190543 A1 | 7/2013 | Barnes |
| 2013/0199788 A1 | 8/2013 | Barnes |
| 2013/0274149 A1 | 10/2013 | Lafitte |
| 2013/0296201 A1 | 11/2013 | Barnes |
| 2014/0005082 A1 | 1/2014 | Barnes |
| 2014/0031265 A1* | 1/2014 | Chang .................. C09K 8/588 507/213 |
| 2014/0110305 A1 | 4/2014 | Barnes |
| 2014/0220350 A1 | 8/2014 | Kim |
| 2014/0224490 A1 | 8/2014 | Barnes |
| 2014/0305649 A1 | 10/2014 | Tang |
| 2015/0079162 A1 | 3/2015 | Hyeon |

FOREIGN PATENT DOCUMENTS

| | | |
|---|---|---|
| WO | WO2011012164 A1 | 2/2011 |
| WO | WO2014068390 A1 | 5/2014 |
| WO | WO2014139037 A1 | 9/2014 |
| WO | WO2014167056 A1 | 10/2014 |
| WO | 2015023648 A1 | 2/2015 |

OTHER PUBLICATIONS

International Search Report and Written Opinion for related PCT application PCT/US2016/026719 dated Jul. 18, 2016.

Couvreur et al., "Nanocapsule Technology: A Review", Critical Reviews in Therapeutic Drug Carrier Systems, 2002, pp. 99-134, vol. 19, No. 2, Begell House, Inc.

Gale et al., "Tertiary Surfactant Flooding: Petroleum Sulfonate Composition-Efficacy Studies", SPE-AIME Symposium on Improved Oil Recovery, 1972, pp. 191-199, American Institute of Mining Metallurgical and Petroleum Engineers Inc.

Wilk et al., "Loaded nanoparticles with cyanine-type photosensitizers: preparation, characterization and encapsulation", ResearchGate, 2009, pp. 1-7.

Xing et al., "Nanoencapsulation of Capsaicin by Complex Coacervation of Gelatin, Acacia, and Tannins", Journal of Applied Polymer Science, 2005, pp. 2225-2229, vol. 96, No. 6, Wiley Periodicals Inc.

The International Search Report and Written Opinion for related PCT application PCT/US2017/013142 dated Mar. 17, 2017.

\* cited by examiner

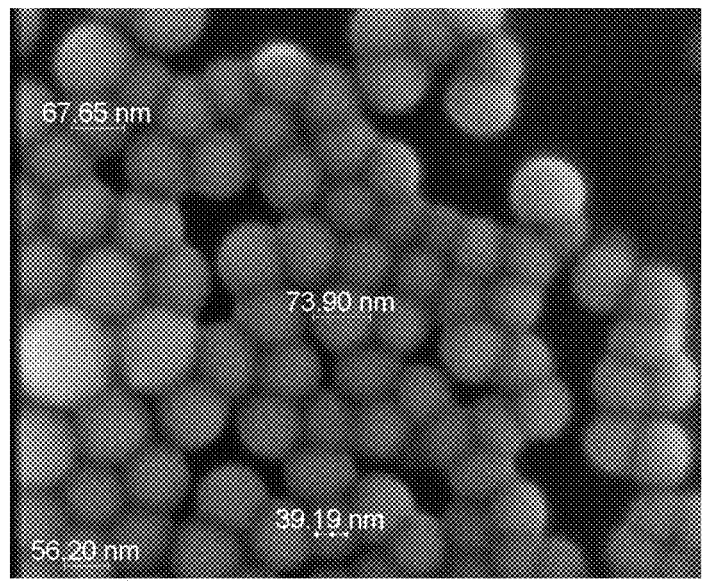

ENCAPSULATED NANOCOMPOSITIONS FOR INCREASING HYDROCARBON RECOVERY

CROSS REFERENCE TO RELATED APPLICATIONS

This application claims priority from U.S. Provisional Application No. 62/145,219 filed on Apr. 9, 2015. For purposes of United States patent practice, this application incorporates the contents of the Provisional Application by reference in its entirety.

TECHNICAL FIELD

Compositions and methods are provided that relate to enhancing the production of subterranean hydrocarbon formations such as crude oil bearing formations. In some embodiments, compositions that relate to nanocompositions comprising surfactant compounds as well as methods related thereto for increasing permeability, mobility and sweep efficiency within a reservoir for enhancing oil recovery are provided.

BACKGROUND

The oil and gas industry has greatly benefited from the use of enhanced oil recovery (EOR) processes, which increase the production of underperforming or problematic wells and fields. Many EOR processes are based on chemical induced well stimulation and may include one or more of (1) chemicals capable of inducing reservoir fractures and creating new or additional hydrocarbon flow channels for moving oil from a formation into a wellbore; (2) chemicals capable of dissolving portions of the reservoir formation and creating alternative flow paths for hydrocarbons; and (3) chemicals capable of enhancing the flow of liquid hydrocarbons such as oil from a reservoir formation into the wellbore.

Surfactants are a commercially important class of compounds capable of reducing the surface tension at liquid-liquid or liquid-solid interfaces. The amphiphilic composition of surfactants allows for their utilization as detergents, emulsifiers, dispersants, foaming agent, wetting agents and anti-coalescents. In the oil and gas industry, surfactants have been used in attempts to increase the conductivity or flow of liquid hydrocarbons in subterranean reservoirs for enhancing oil recovery, e.g. following water flooding and/or steam flooding of a subterranean hydrocarbon bearing reservoir.

However, the use of techniques such as steam flooding can induce gravity override in the subterranean hydrocarbon bearing reservoir. The reservoir heterogeneity generated by primary recovery techniques such as steam flooding is a well-established challenge in the oil and gas industry, particularly for commercial entities involved in crude oil production and related downstream applications. In addition, the presence of thief zones, formational fractures, high permeability streaks and related geological formations within subterranean hydrocarbon bearing reservoirs are continuing challenges in primary oil recovery and EOR operations.

SUMMARY

The need therefore exists for methods and compositions capable of increasing EOR efforts for liquid hydrocarbon recovery. Compositions and methods are provided that relate to enhancing the production of subterranean hydrocarbon formations such as crude oil bearing formations. In some embodiments, compositions that relate to nanocompositions comprising surfactant compounds as well as methods related thereto for increasing permeability, mobility and sweep efficiency within a reservoir for enhancing oil recovery are provided. Described are nanoencapsulated compositions and related methods for increasing production hydrocarbon bearing reservoirs.

In a first aspect, a method for increasing production in a liquid hydrocarbon reservoir formation is provided. The method includes the steps of (a) introducing a nanoencapsulated composition solution capable of reducing the surface tension of a liquid hydrocarbon fraction into a wellbore operably engaged with the liquid hydrocarbon reservoir formation. The nanoencapsulated composition solution includes a nanocapsule and a carrier fluid, such that the nanocapsule is dispersed in the carrier fluid. The method further includes the steps of (b) allowing the nanoencapsulated composition solution to sufficiently interact with the liquid hydrocarbon fraction such that the surface tension of the liquid hydrocarbon fraction is sufficiently reduced such that at least a portion of the liquid hydrocarbon fraction is capable of being displaced from the liquid hydrocarbon reservoir formation; (c) introducing a water fraction into the wellbore under conditions such that at least a portion of the liquid hydrocarbon fraction is displaced from the liquid hydrocarbon reservoir formation; and (d) recovering the at least a portion of the liquid hydrocarbon fraction displaced from the liquid hydrocarbon reservoir formation and at least a portion of the nanoencapsulated composition solution using the wellbore.

In certain aspects, the nanocapsule includes two or more surfactants selected from the group consisting of a sulfonate based surfactant, a sulfate based surfactant and a phosphate based surfactant. In certain aspects, the nanocapsule includes petroleum sulfonate. In certain aspects, the nanocapsules are characterized by individual diameters of between about 200 nanometers and about 1000 nanometers. In certain aspects, the nanoencapsulated composition solution is introduced into the wellbore at a nanocapsule concentration in the range of about 0.01% by weight to about 10% by weight. In certain aspects, steps (a) through (d) above are repeated one or more times for enhancing the recovery of a residual liquid hydrocarbon fraction from the liquid hydrocarbon reservoir formation. In certain aspects, the liquid hydrocarbon fraction includes crude oil. In certain aspects, the method further includes introducing a primary oil recovery composition for recovering a primary liquid hydrocarbon fraction from the liquid hydrocarbon reservoir formation prior to step (a) above. In certain aspects, the primary oil recovery composition is selected from water, natural gas, air, carbon dioxide, nitrogen and combinations thereof. In certain aspects, the method further includes introducing a deflocculant into the wellbore operably engaged with the liquid hydrocarbon reservoir formation prior to step (c) above. In certain aspects, the deflocculant is selected from the group consisting of lignite, tannin, polycarbonate, polycarboxylate, polyacrylamide, sodium carboxymethyl cellulose, sodium citrate, sodium silicate, ammonium oxalate, sodium oxalate, gum arabic, humic acid resin, bentonite, and combinations thereof. In certain aspects, the method further includes introducing a proppant into the wellbore operably engaged with the liquid hydrocarbon reservoir formation prior to step (a). In certain aspects, the proppant is selected from the group consisting of sand, clay, bauxite, alumina and aluminosilicates and combinations thereof. In certain aspects, the method further includes introducing a dispersant into the wellbore operably engaged with the liquid hydrocarbon reservoir formation prior to step (a). In certain embodiments, the dispersant is selected from the group consisting of lignosulfate, polymethacrylate, hydroxypropyl methacrylate polyacrylamide, sodium vinyl sulfonate, sodium acrylamidomethylpropane sulfonate, phosphonobutane tricarboxylic acid, amino trimethylene phosphonic acid, hydroxyethylidene diphosphonic acid, sodium hydroxyethylidene diphosphonate, diethylenetriamine pentamethylene phosphonic acid and combinations thereof. In certain aspects, the method further includes introducing a dispersant into the wellbore operably engaged with the liquid hydrocarbon reservoir formation prior to step (c). In certain aspects, liquid hydrocarbon recovery is increased by at least 10%.

In a second aspect, a method of forming a nanocapsule for use in a nanoencapsulated composition solution is provided. The method includes the steps of (a) mixing an aqueous-phase chemical with water to form an aqueous phase, (b) mixing a solvent-phase monomer with a solvent and one or more surfactants to form a solvent phase, (c) dispersing the solvent phase in the aqueous phase, such that the solvent phase forms droplets in the aqueous phase and a surface of the droplets forms an interface between the aqueous phase and the solvent phase, and (d) allowing the aqueous-phase chemical and the solvent-phase monomer to polymerize at the interface to form a polymer shell, wherein the polymer shell encapsulates the one or more surfactants and the solvent.

In a third aspect, a coacervation method of forming a nanocapsule for use in a nanocapsulated composition solution is provided. The coacervation method includes the steps of (a) mixing an aqueous-phase chemical with water to form an aqueous phase, where the aqueous-phase chemical includes gelatin, (b) mixing a solvent-phase monomer with a solvent and one or more surfactants to form a solvent phase, (c) mixing the solvent phase in the aqueous phase, such that the solvent phase forms droplets dispersed in the aqueous phase to form a mixture, where the droplets have a surface, (d) adding a precipitating agent to the mixture, the precipitating agent operable to reduce a solubility of the aqueous-phase chemical in the mixture such that the aqueous-phase chemical is capable of precipitating from the mixture, (e) allowing the aqueous-phase chemical to precipitate from the mixture to form a precipitating aqueous-phase chemical, where the precipitating aqueous-phase chemical deposits on the surface of the droplets to form a deposited aqueous-phase chemical, and (f) allowing the deposited aqueous-phase chemical to form a polymer shell around the droplets, wherein the polymer shell is formed by the crosslinking of the deposited aqueous-phase chemical.

BRIEF DESCRIPTION OF THE DRAWING

So that the manner in which the features, advantages and objects of the embodiments as well as others which will become apparent, are attained, and can be understood in more detail, more particular description briefly summarized above may be had by reference to the embodiments thereof which are illustrated in the appended drawing that forms a part of this specification. It is to be noted, however, that the drawing illustrates only a preferred embodiment and is therefore not to be considered limiting of its scope as there may admit to other equally effective embodiments. The preferred embodiment will be better understood on reading the following detailed description of non-limiting embodiments thereof, and on examining the accompanying drawing, in which:

FIG. 1 is a scanning electron micrograph of sulfonate comprising nanocapsules in accordance with some embodiments described.

DETAILED DESCRIPTION

Although the following detailed description contains specific details for illustrative purposes, the skilled artisan will appreciate that many examples, variations and alterations to the following details are within the inventive scope and spirit. Accordingly, the exemplary embodiments described here are set forth without any loss of generality, and without undue limitations.

Compositions and methods for enhancing the production of subterranean hydrocarbon formations such as crude oil bearing formations are provided. A nanoencapsulated composition solution is introduced into a wellbore, where the nanoencapsulated composition solution includes a nanocapsule and a carrier fluid, such that the nanocapsule is dispersed in the carrier fluid. The nanocapsule includes one or more surfactants capable of reducing the surface tension of a liquid hydrocarbon fraction in a liquid hydrocarbon reservoir formation. The methods can for increasing permeability, mobility and sweep efficiency within a reservoir for enhancing oil recovery. In preferred embodiments, the present invention relates to nanoencapsulated surfactant compositions that exhibit advantageous size and temporal controllability. The compositions, in some embodiments, demonstrate enhanced targeting of subterranean oil reservoirs via reduced adsorption in non-hydrocarbon bearing areas associated with or peripheral to a wellbore.

As used here, the term "surfactant" refers to a compound capable of reducing the interfacial tension between two media, such as two liquids or a liquid and a solid. A surfactant may refer to a cationic, anionic, zwitterionic or nonionic compound capable of behaving as a surfactant. In preferred embodiments, a surfactant is an anionic compound such as a sulfonate.

As used here, the terms "sweep efficiency" and "volumetric sweep efficiency" refer to the efficacy of a process for increasing hydrocarbon recovery, including enhanced oil recovery (EOR) processes.

As used here, a "crosslinking agent" refers to a compound capable of chemically bonding to and thereby connecting ("crosslinking") two or more individual polymers. In certain embodiments, the crosslinking agent may form one or more covalent bonds with the polymers. A crosslinking agent may bond to a polymer via a carbonyl, sulfhydryl, amine or imine chemical group on the crosslinking agent. A crosslinking agent is not limited to any particular spatial arrangement and may, in certain embodiments, assume one or more of a linear, branched, blocked or dendrimeric structure prior to or following bonding to two or more individual polymers.

As used herein, "liquid hydrocarbon reservoir formation" refers to a subterranean reservoir formation that contains crude oil. Liquid hydrocarbon reservoir formation includes a hydrocarbon bearing formation and a liquid hydrocarbon bearing formation.

The term "solvent-phase monomer" refers to a monomer that is soluble in the solvent phase and insoluble in the aqueous phase and is reactive with the aqueous-phase chemical. For example, isocyanate is a monomer that is soluble in dibutyl sebacate, but not in water.

The term "aqueous-phase chemical" refers to a monomer, gelling agent, or a chemical that is soluble in the aqueous phase and insoluble in the solvent phase and is reactive with the solvent-phase monomer. An example of a chemical that can be used as the aqueous-phase chemical is gelatin.

The compositions and methods advantageously encapsulate surfactants. It is understood by one of skill in the art that surfactants can be slightly water soluble so they bridge between the aqueous and non-aqueous interface. In conventional surfactant operations, significant surfactant is lost due to adsorption by the rock near the wellbore area where there is a large amount of bare rock, but a small amount of oil. Water soluble surfactants need to be encapsulated to mitigate the adsorption loss and the capsule must be small enough to traverse the oil reservoir. The methods and compositions provide for a nano-sized encapsulated surfactant, where the encapsulated surfactant can break out of the capsule, after certain periods of time, to solubilize oil. The methods and compositions provide for the break out time to be controlled by the toughness and the thickness of the encapsulation shell. The methods and compositions provide for a way to control the release rate of surfactants.

The compositions and methods described address problems associated with the recovery of liquid hydrocarbons from liquid hydrocarbon reservoir formations by injecting nanoencapsulated compositions capable of reducing the surface tension of a liquid hydrocarbon fraction in the liquid hydrocarbon reservoir formation. The methods and compositions disclosed here advantageously increase primary liquid hydrocarbon recovery efforts as well as enhanced oil recovery (EOR) processes for liquid hydrocarbons, particularly crude oil, following their introduction into a liquid hydrocarbon reservoir formation. In addition, primary recovery techniques such as water flooding may precede and/or follow the introduction of the nanoencapsulated compositions such that overall liquid hydrocarbon recovery is increased.

While not limiting the embodiments to any particular physiochemical properties or characteristics, the methodologies and related compositions described here may advantageously reduce the volume of the compositions used to increase primary and/or EOR liquid hydrocarbon recovery efforts as well as enhanced oil recovery (EOR) processes for liquid hydrocarbons as compared to previously disclosed or commercially available compositions for use in liquid hydrocarbon recovery. Advantageously and unexpectedly, the methodologies and related compositions described here can be used to make sub-micron particles, that is particles with a diameter less than 200 nm. For instance, the nanocapsules can be synthesized with diameters as small as approximately 20 nanometers (nm), which can reduce the treatment volume and associated costs and efforts for treating a subterranean reservoir formation bearing crude oil. One of skill in the art would understand that to be useful in oil recovery, particles must be submicron sized.

In certain embodiments, the methods and compositions described here advantageously and unexpectedly enhance liquid hydrocarbon recovery by increasing liquid hydrocarbon flow and conductivity for a liquid hydrocarbon fraction in a subterranean reservoir formation. The formation may comprise complex geological formations such as heterogeneous reservoir formations which may prevent traditional primary oil recovery and/or EOR techniques from effectively and economically inducing liquid hydrocarbon flow, e.g. via reduced (volumetric) sweep efficiency. The methods and nanoencapsulated compositions increase liquid hydrocarbon flow, sweep efficiency and therefore liquid hydrocarbon recovery.

The nanoencapsulated composition solution is formed by mixing nanocapsules in a carrier fluid. An form of mixing can be used that results in the nanocapsules being dispersed in the carrier fluid. The nanocapsule concentration is the amount of nanocapsules in the carrier fluid. The nanocapsule concentration can be in the range from about 0.01 percent (%) by weight to about 10% by weight. In certain embodiments, the nanocapsule concentration can be about 1% by weight, alternately 2% by weight, alternately 3% by weight, alternately 4% by weight, and alternately 5% by weight.

A nanocapsule is a spherically shaped capsule that contains a polymer shell surrounding two or more surfactants together with a solvent.

In a first method of making a nanocapsule, an interfacial polymerization method is utilized. At least one surfactant and a solvent-phase monomer are added to a solvent to form a solvent phase. The amount of surfactant in the solvent phase can range from between about 1 wt % to about 50 wt %. The amount of solvent-phase monomer in the solvent phase can range from between about 1 wt % to about 30 wt %. The solvents suitable for use include iso-octane, acetone, dibutyl sebacate, and mixtures thereof.

Surfactants suitable for use include sulfonate based surfactants, sulfate based surfactants and phosphate based surfactants. Examples of sulfonate based surfactants include petroleum sulfonate, dodecylbenzene sulfonate, and other alkyl sulfonates. Examples of sulfate based surfactants include sodium dodecyl sulfate and other alkyl sulfates. Examples of phosphate based surfactants include alkyl phosphates. In embodiments where two or more surfactants are used, the two surfactants are different from each other. In at least one embodiment, the surfactant is petroleum sulfonate.

An aqueous-phase chemical is added to water to form an aqueous phase. The amount of aqueous-phase chemical in the aqueous phase can be in the range from 1 wt % to about 30 wt %.

The solvent phase is then dispersed in the aqueous phase. Any method of dispersing the solvent phase in the aqueous phase that results in forming droplets of the solvent phase in the aqueous phase can be used. Examples of methods to disperse the solvent phase include mixing, blending, and shaking. After adding the solvent phase to the aqueous phase, the aqueous phase contains droplets of solvent phase throughout. The solvent phase and aqueous phase can be immiscible to each other. The surface of the droplets forms the interface between the solvent phase and the aqueous phase.

The polymer shell forms from the reaction of the solvent-phase monomer and the aqueous-phase chemical due to interfacial polymerization. In interfacial polymerization, the solvent-phase monomer and the aqueous-phase chemical "see" each other at the interface and polymerize at the interface to form the polymer shell. Because the polymer shell forms at the interface of the solvent phase droplet, the polymer shell encapsulates the droplet and in doing so encapsulates the solvent and surfactant in the solvent-phase droplet. The use of a solvent-phase monomer and an aqueous-phase chemical unexpectedly generated nanosized capsules.

The use of a solvent-phase monomer and an aqueous-phase chemical advantageously formed nanocapsules that are nano-sized particles. The nanocapsules can be characterized by individual diameters of between about 200 nanometers and about 1000 nanometers.

In at least one embodiment, the aqueous phase is the continuous phase and after reaction the resultant nanocapsules can be dispersed in the aqueous phase forming a nanocapsule dispersion. The nanocapsule dispersion can be mixed into the carrier fluid to form the nanoencapsulated composition solution that can be used for oil recovery.

In embodiments employing the interfacial polymerization method, the shell thickness of the polymer shell can be controlled. The shell thickness can be controlled by the amount of aqueous-phase chemical and solvent-phase monomer used. Shell thickness can be increased by increasing the concentration of aqueous-phase chemical and solvent-phase monomer.

In a second method of forming a nanocapsule, the polymer shell is formed by a coacervation method. In embodiments employing the coacervation method, the aqueous-phase chemical is gelatin, which is mixed with water to form the aqueous phase. At least one surfactant and a solvent-phase monomer are mixed with the solvent to form the solvent phase. The solvent phase is dispersed in the aqueous phase in the form of droplets. After the solvent phase is dispersed in the aqueous phase in the form of droplets, a precipitating agent is added to the mixture. The precipitating agent changes the solubility of the gelatin in water, causing the gelatin to precipitate out as a precipitating aqueous-phase chemical. In at least one embodiment of the present invention, the precipitating agent is a salt and this is known as a "salting out" phenomenon. The precipitating aqueous-phase chemical deposits on non-aqueous surfaces, such as the surface of the droplets of the solvent phase to form a deposited aqueous-phase chemical. The deposited aqueous-phase chemical then forms the polymer shell due to cross-linking around the droplets and encapsulates the droplets of the solvent phase. In at least one embodiment, the precipitating agent is ammonium sulfate.

In embodiments employing the coacervation method of forming nanocapsules, the degree of crosslinking of the polymer shell can be controlled. The degree of crosslinking of the polymer shell can be controlled by adding an amount of crosslinking agent. The crosslinking agent can be glutaraldehyde. The degree of crosslinking can be measured by the amount of swelling of the polymer or the rate of degradation. The greater the degree of crosslinking the less a polymer particle is expected to swell. The greater the degree of crosslinking the slower the rate of degradation or disintegration of the polymer particle in hot water.

In the methods of forming nanocapsules, the solvent phase and the aqueous phase can be heated as needed to increase dispersion or initiate formation of the polymer shell. The methods and compositions described here are in the absence of the use of a fluidized bed to encapsulate the particles. The methods and compositions described to form the nanocapsules are in the absence of the use of polymer as a raw material.

The nanoencapsulated composition solutions can be mixed with a carrier fluid used for increasing production in a liquid hydrocarbon reservoir formation. In at least one embodiment, the nanoencapsulated composition solution can include nanocapsules, water, and other production chemicals. The nanoencapsulated composition solution is introduced into the liquid hydrocarbon reservoir formation. The nanoencapsulated composition solution is introduced into the wellbore at a concentration of between about 0.01% by weight and about 10% by weight of the nanoencapsulated composition solution, alternately at a concentration of about 1% by weight of the nanoencapsulated composition solution, alternately at a concentration of about 2% by weight of the nanoencapsulated composition solution, alternately at a concentration of about 3% by weight of the nanoencapsulated composition solution, alternately at a concentration of about 4% by weight of the nanoencapsulated composition solution, and alternately at a concentration of about 5% by weight of the nanoencapsulated composition solution. In at least one embodiment, the nanoencapsulated composition solution is introduced to a wellbore that is fluidly connected to a liquid hydrocarbon reservoir formation. In at least one embodiment, the wellbore is an injection well that is part of a pairing that includes an injection well and a recovery well.

The nanoencapsulated composition solution is allowed to interact with the liquid hydrocarbon fraction in the liquid hydrocarbon reservoir formation for a residual time period. In at least one embodiment, the liquid hydrocarbon fraction is crude oil. In at least one embodiment, the liquid hydrocarbon fraction is crude oil and the portion of liquid hydrocarbon fraction is an amount of crude oil. The polymer shell of the nanocapsule degrades over time with exposure to heat. As the polymer shell degrades, the one or more surfactant is released from the nanocapsule, which depletes the nanocapsule. The one or more surfactant reduces the surface tension of the liquid hydrocarbon fraction. By reducing the surface tension, the liquid hydrocarbon fraction can be displaced from the liquid hydrocarbon reservoir formation. The residual time period can be between about 0.1 days (2.4 hours) and about 300 days, alternately the residual time period can be about one (1) day, alternately between about one (1) day and about seven (7) days, alternately about seven (7) days, alternately between seven (7) days and about thirty (30) days, alternately about (30) thirty days, and alternately about 180 days.

In a next step of the method for increasing production in a liquid hydrocarbon reservoir formation, a water fraction is introduced to the wellbore following the residual time period. The water fraction is introduced at a pressure that causes a portion of the liquid hydrocarbon fraction to be displaced from the liquid hydrocarbon reservoir formation. In at least one embodiment, the water fraction floods the wellbore. In at least one embodiment, the water fraction is introduced to the injection well and pushes the liquid hydrocarbon fraction from the liquid hydrocarbon reservoir formation. In at least one embodiment, the water fraction floods the liquid hydrocarbon reservoir formation.

The portion of the liquid hydrocarbon fraction that is displaced from the liquid hydrocarbon reservoir is recovered as a recovered. In at least one embodiment, the portion of the liquid hydrocarbon fraction that is displaced from the liquid hydrocarbon reservoir is recovered from the recovery well. In at least one embodiment, the recovered fluid can include the portion of the liquid hydrocarbon fraction recovered and an amount of the nanoencapsulated composition solution.

The steps of the method can be repeated to enhance the recovery of a residual liquid hydrocarbon fraction from the liquid hydrocarbon reservoir formation. The residual liquid hydrocarbon fraction refers to the liquid hydrocarbon fraction remaining in the liquid hydrocarbon reservoir formation following a production method. In at least one embodiment, the residual liquid hydrocarbon fraction equals the difference between the liquid hydrocarbon fraction minus the at least a portion of the liquid hydrocarbon fraction that is recovered. The method for increasing production results in a liquid hydrocarbon recovery that is increased by at least 10%, alternately by at least 20%, alternately by at least 50%, and alternately by at least 75%.

The method for increasing production can include additional steps. In at least one embodiment, a primary oil recovery composition for recovering a primary liquid hydrocarbon fraction from the liquid hydrocarbon reservoir formation can be introduced to the wellbore prior to the step of introducing the nanoencapsulated composition solution. The primary oil recovery composition can include water, natural gas, air, carbon dioxide, nitrogen, and combinations thereof. In at least one embodiment, a proppant can be introduced prior to the step of introducing the nanoencapsulated composition solution. The proppant can include sand, clay, bauxite, alumina, aluminosilicates, and combinations thereof. In at least one embodiment, a dispersant can be introduced to the wellbore prior to the step of introducing the nanoencapsulated composition solution. The dispersant can include lignosulfate, polymethacrylate, hydroxypropyl methacrylate polyacrylamide, sodium vinyl sulfonate, sodium acrylamidomethylpropane sulfonate, phosphonobutane tricarboxylic acid, amino trimethylene phosphonic acid, hydroxyethylidene diphosphonic acid, sodium hydroxyethylidene diphosphonate, diethylenetriamine pentamethylene phosphonic acid and combinations thereof.

In at least one embodiment, a deflocculant can be introduced to the wellbore prior to the step of introducing a water fraction into the wellbore. The deflocculant can include lignite, tannin, polycarbonate, polycarboxylate, polyacrylamide, sodium carboxymethyl cellulose, sodium citrate, sodium silicate, ammonium oxalate, sodium oxalate, gum arabic, humic acid resin, bentonite, and combinations thereof. In at least one embodiment, a dispersant can be introduced to the wellbore prior to the step of introducing a water fraction into the wellbore. The dispersant can include lignosulfate, polymethacrylate, hydroxypropyl methacrylate polyacrylamide, sodium vinyl sulfonate, sodium acrylamidomethylpropane sulfonate, phosphonobutane tricarboxylic acid, amino trimethylene phosphonic acid, hydroxyethylidene diphosphonic acid, sodium hydroxyethylidene diphosphonate, diethylenetriamine pentamethylene phosphonic acid and combinations thereof.

The methods and nanoencapsulated compositions can beneficially be supplemented with one or more additional compositions capable of increasing liquid hydrocarbon recovery or targeting of the liquid hydrocarbon fraction of the subterranean reservoir formation by the nanoencapsulated compositions described. In non-limiting embodiments, these additional compositions include but are not limited to surfactants such as hydrocarbon based surfactants, sulfonate based surfactants, sulfate based surfactants and phosphate based surfactants.

EXAMPLES

The following examples are included to demonstrate preferred embodiments. It should be appreciated by those of skill in the art that the techniques and compositions disclosed in the examples which follow represent techniques and compositions discovered by the inventors to function well, and thus can be considered to constitute preferred modes for its practice. However, those of skill in the art should, in light of the present disclosure, appreciate that many changes can be made in the specific embodiments which are disclosed and still obtain a like or a similar result without departing from the inventive spirit and scope.

Example 1

Preparation of Nanocapsules I. In Example 1, petroleum sulfonate nanocapsules were prepared. The aqueous-based chemical was gelatin and was mixed with water to produce a 5% aqueous gelatin solution as the aqueous phase. The solvent phase was produced by mixing 100 grams (g) of iso-octane (as a solvent), 40 g of acetone (as a second solvent) and 5% Polartech® Fusion 460 (Afton Chemical, Richmond, Va.) as the source of petroleum sulfonate as the surfactant. One hundred (100) grams of the aqueous phase was heated to a temperature of 60° C. to help dissolve the gelatin, followed by the addition of 100 grams of the solvent phase and 100 grams of 20% ammonium sulfate and vigorously stirred using a magnetic stirrer for two (2) hours at 60° C. The ammonium sulfate acted a precipitating agent to aid precipitation of the gelatin from the aqueous phase. Five (5) grams of 25% glutaraldehyde (as a crosslinking agent) were then added to the mixture, and the resulting solution was allowed to cool overnight to room temperature. The resulting nanocapsules that were collected exhibited diameters in a range of from about 200 nanometers (nm) to one (1) micrometer ($\mu$m) as determined using a Quanta Model 250 FEG scanning electron microscopy (SEM) (FEI, Hillsboro, Oreg.).

Example 2

Preparation of Nanocapsules II. In an alternative methodology, petroleum sulfonate based nanocapsules were synthesized. The solvent phase was created by initially mixing 40 grams of dibutyl sebacate (Sigma Aldrich, St. Louis, Mo.) (as the solvent), 10 grams of toluene diisocyanate (Sigma Aldrich, St. Louis, Mo.) (as the solvent-phase monomer), 12 grams of polyvinyl alcohol (Sigma Aldrich, St. Louis, Mo.) (as the solvent-phase monomer) and 10 grams of EOR2095 (Chemtura Chemicals, Philadelphia, Pa.) as a source of petroleum sulfonate (as the surfactant) in 250 ml deionized water under vigorous stirring for twenty (20) minutes at room temperature using a magnetic stirrer. 250 ml of deionized water and a 40 ml solution of 20% aqueous triethylenetetramine (TETA) (as the aqueous-phase chemical) were added to the solution. The solution temperature was then increased to 55° C. and vigorously stirred for 3 hours, resulting in a colloidal dispersion. The resulting dispersion was diluted with approximately 450 ml of deionized water, resulting in a petroleum sulfate concentration of approximately 10,000 ppm in the nanoencapsulated composition solution. As shown in FIG. 1, the dispersion comprised nanocapsules ranging in diameter from about 20 nm to about 200 nm.

Example 3

Properties of Nanocapsules I. The nanocapsules of Example 2 were placed in a 90° C. oven, with the resulting petroleum sulfonate concentration recorded after 20, 48, 116, 140, 260, 468 and 596 hours (Table I) using a Mitsubishi Model NSX-2100V sulfur analyzer (Mitsubishi Corporation, New York, N.Y.). While not limiting to any particular theory or theories, it is believed that the observed increases in concentration of petroleum sulfonate over time are attributable to the increased presence of petroleum sulfonate in a continuous (non-dispersed) phase that can advantageously disperse following the injection of the nanocapsules into a subterranean reservoir or related downhole formation.

TABLE I

Time dependent measurement of petroleum sulfonate concentration (in ppm) in nanocapsules following heating at T = 90° C.

| Time elapsed (hours) | Petroleum sulfonate concentration (ppm) |
|---|---|
| 0 | 1007 |
| 20 | 2324 |
| 48 | 3560 |
| 116 | 3560 |
| 140 | 3560 |
| 260 | 4165 |
| 428 | 5240 |
| 596 | 6181 |

Example 4

Properties of Nanocapsules II. The methods and compositions were further evaluated for some embodiments related to secondary and tertiary enhanced oil recovery. A subterranean reservoir formation comprising sedimentary rock core was subjected to a primary crude oil recovery procedure (water flooding) and exhibited a residual oil saturation level of approximately 60% following water flooding. The sedimentary rock core was subsequently injected with the nanoencapsulated composition solution of Example 2 using fresh water under ambient conditions such that the resulting pore volume of the sedimentary rock core with the dispersed nanocapsule composition was approximately 40%. The sedimentary rock core comprising the nanoencapsulated composition solution was then heated to 90° C. for approximately 168 hours (seven (7) days) such that rupturing of the nanocapsules was induced. The sedimentary rock core was then flooded with approximately 100 ml of fresh water under ambient conditions, resulting in a crude oil recovery of approximately 3% with respect to total estimated crude oil volume. The sedimentary rock core was then flooded with one (1) equivalent pore volume of a 1% petroleum sulfonate solution at room temperature, which did not result in any further, measurable crude oil recovery.

Although the embodiments have been described in detail, it should be understood that various changes, substitutions, and alterations can be made hereupon without departing from the inventive principle and scope. Accordingly, the scope of the embodiments should be determined by the following claims and their appropriate legal equivalents.

The singular forms "a", "an" and "the" include plural references, unless the context clearly dictates otherwise.

"Optional" or "optionally" means that the subsequently described component may or may not be present or the event or circumstances may or may not occur. The description includes instances where the component is present and instances where it is not present, and instances where the event or circumstance occurs and instances where it does not occur.

Ranges may be expressed here as from about one particular value, or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art, except when these references contradict the statements made here.

What is claimed is:

1. A method for increasing production in a liquid hydrocarbon reservoir formation, the method comprising the steps of:
   a. introducing a nanoencapsulated composition solution capable of reducing the surface tension of a liquid hydrocarbon fraction into a wellbore operably engaged with the liquid hydrocarbon reservoir formation, wherein the nanoencapsulated composition solution comprises a nanocapsule and a carrier fluid, such that the nanocapsule is dispersed in the carrier fluid, where the nanocapsule comprises a polymer shell and a surfactant, such that the polymer shell encapsulates the surfactant;
   b. exposing the nanoencapsulated composition to heat from the liquid hydrocarbon reservoir formation;
   c. allowing the polymer shell of the nanocapsule to degrade upon exposure to heat, such that the surfactant is released from the nanocapsule;
   d. allowing the nanoencapsulated composition solution to sufficiently interact with the liquid hydrocarbon fraction such that the surface tension of the liquid hydrocarbon fraction is sufficiently reduced such that at least a portion of the liquid hydrocarbon fraction is capable of being displaced from the liquid hydrocarbon reservoir formation, where the surfactant reduces the surface tension;
   e. introducing a water fraction into the wellbore under conditions such that at least a portion of the liquid hydrocarbon fraction is displaced from the liquid hydrocarbon reservoir formation; and
   f. recovering the at least a portion of the liquid hydrocarbon fraction displaced from the liquid hydrocarbon reservoir formation and at least a portion of the nanoencapsulated composition solution using the wellbore.

2. The method of claim 1, wherein the nanocapsule comprises one or more surfactants selected from the group consisting of a sulfonate based surfactant, a sulfate based surfactant and a phosphate based surfactant.

3. The method of claim 1, wherein the nanocapsule comprises petroleum sulfonate.

4. The method of claim 1, wherein the nanocapsules are characterized by individual diameters of between 200 nanometers and 1000 nanometers.

5. The method of claim 1, wherein the nanoencapsulated composition solution is introduced into the wellbore at a nanocapsule concentration in the range of 0.1% by weight to 10% by weight.

6. The method of claim 1, further comprising repeating steps (a) through (d) one or more times for enhancing the recovery of a residual liquid hydrocarbon fraction from the liquid hydrocarbon reservoir formation.

7. The method of claim 1, wherein the liquid hydrocarbon fraction comprises crude oil.

8. The method of claim 1, further comprising introducing a primary oil recovery composition for recovering a primary liquid hydrocarbon fraction from the liquid hydrocarbon reservoir formation prior to step (a).

9. The method of claim 8, wherein the primary oil recovery composition is selected from water, natural gas, air, carbon dioxide, nitrogen and combinations thereof.

10. The method of claim 1, further comprising introducing a deflocculant into a wellbore operably engaged with the liquid hydrocarbon reservoir formation prior to step (c).

11. The method of claim 10, wherein the deflocculant is selected from the group consisting of lignite, tannin, polycarbonate, polycarboxylate, polyacrylamide, sodium carboxymethyl cellulose, sodium citrate, sodium silicate, ammonium oxalate, sodium oxalate, gum arabic, humic acid resin, bentonite, and combinations thereof.

12. The method of claim 1, further comprising introducing a proppant into a wellbore operably engaged with the liquid hydrocarbon reservoir formation prior to step (a).

13. The method of claim 12, wherein the proppant is selected from the group consisting of sand, clay, bauxite, alumina and aluminosilicates and combinations thereof.

14. The method of claim 1, further comprising introducing a dispersant into a wellbore operably engaged with the liquid hydrocarbon reservoir formation prior to step (a).

15. The method of claim 14, wherein the dispersant is selected from the group consisting of lignosulfate, polymethacrylate, hydroxypropyl methacrylate polyacrylamide, sodium vinyl sulfonate, sodium acrylamidomethylpropane sulfonate, phosphonobutane tricarboxylic acid, amino trimethylene phosphonic acid, hydroxyethylidene diphosphonic acid, sodium hydroxyethylidene diphosphonate, diethylenetriamine pentamethylene phosphonic acid and combinations thereof.

16. The method of claim 1, further comprising introducing a dispersant into a wellbore operably engaged with the liquid hydrocarbon reservoir formation prior to step (c).

17. The method of claim 16, wherein the dispersant is selected from the group consisting of lignosulfate, polymethacrylate, hydroxypropyl methacrylate polyacrylamide, sodium vinyl sulfonate, sodium acrylamidomethylpropane sulfonate, phosphonobutane tricarboxylic acid, amino trimethylene phosphonic acid, hydroxyethylidene diphosphonic acid, sodium hydroxyethylidene diphosphonate, diethylenetriamine pentamethylene phosphonic acid and combinations thereof.

18. The method of claim 1, wherein liquid hydrocarbon recovery is increased by at least 10%.

\* \* \* \* \*